Feb. 8, 1966 J. H. TATHWELL 3,233,918
ACCOUNTING FORMS
Filed Jan. 27, 1964

INVENTOR.
JOSEPH H. TATHWELL
BY Lyon & Lyon
ATTORNEYS

United States Patent Office 3,233,918
Patented Feb. 8, 1966

3,233,918
ACCOUNTING FORMS
Joseph H. Tathwell, 4536 Commonwealth Ave.,
La Canada, Calif.
Filed Jan. 27, 1964, Ser. No. 340,371
7 Claims. (Cl. 282—9)

This invention relates to accounting forms and has particular reference to novel means in booklet form for simultaneous entry and posting of accounting information.

Many different types of accounting forms and devices, designed to reduce the time and effort required to maintain proper records, have heretofore been proposed and used. One example of a means for maintaining payroll records is found in my U.S. Patent No. 2,470,586, which discloses a booklet form arrangement of ganged or shingled record forms assembled in overlapped relation and disposed in record correspondence with a summary sheet for simultaneous posting, the patent further disclosing specific means for facilitating the use of the forms and preventing the misalignment of unturned statement forms by the pull of those forms which have been turned during operation. The structures and means of said patent have been used extensively, but are not applicable to the type of form wherein so-called "reverse shingling" is utilized, i.e., wherein the record forms are assembled in ganged, overlapped relation with the lowermost form, rather than the uppermost form, being fully exposed. A primary object of the present invention is, therefore, to provide novel and improved accounting forms of the reverse shingled type.

A further object of the present invention is to provide an accounting form of the type having a plurality of reverse shingled record forms and including novel means for facilitating the quick and accurate manipulation of the forms in use thereof.

A further object of the present invention is to provide accounting forms of the type described which are simple in construction, relatively inexpensive to produce on a quantity basis and adapted to be used even by relatively unskilled personnel.

Further objects and advantages of this invention it is believed will be readily apparent from the following detailed description thereof when read in connection with the accompanying drawings.

Figure 1:
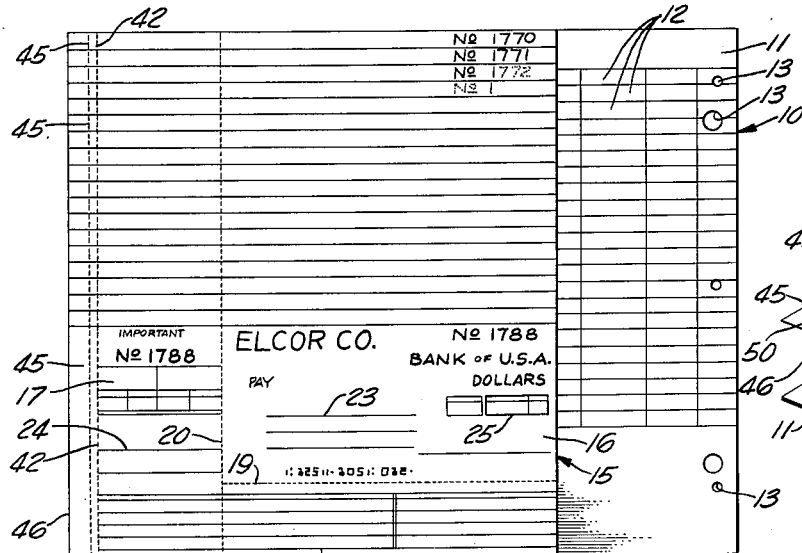
FIGURE 1 is a plan view illustrating the general arrangement of a preferred embodiment of the invention.

Referring now to the drawings, the booklet of the present invention is generally indicated 10 and includes a summary or journal sheet 11 provided with a plurality of appropriate entry spaces 12 as well as apertures 13 for installation in and removal from a loose-leaf binder (not shown).

Operably attached to the journal sheet 11 is a plurality of record forms 15 each of which may, as shown, comprise a check 16, a numbered identifying stub 17 and an information form 18. The stub 17 and form 18 are detachable from the check 16, perforations 19 and 20 respectively, being provided for this purpose. The record form or check 15 is preferably provided on the back surface thereof with one or more portions 22 of impression transfer material, such portions underlying appropriate entry areas, such as those designated 23, 24 and 25, which may be used, for example, for entry of the payee's name and the amount of the check, these areas being aligned with the appropriate entry spaces 12 on the journal sheet 11 for causing duplication of the entries made on the check. It is to be understood that the specific structure and nature of the record form 15 as thus described is merely illustrative, and the invention is not to be limited thereto. Further, the portions 22 may be omitted and the booklet used with conventional carbon paper sheets.

The record forms 15 are attached to the journal sheet 11 in the reverse shingled fashion, with the lowermost form 15 fully exposed, the remaining forms 15 extending upwardly in mutually overlapping relation with only the topmost portion thereof being exposed. In use of this type of form, it is necessary to open the booklet in the manner shown in FIGURE 2, so that only the single, uppermost form 15 remains in superposed relation to the journal sheet 11, in position to receive the entries to be made thereon. The advantage of this type of shingling is that any area of the form 15 can be provided with impression transfer material for duplication upon the journal sheet of any enrty made upon the form 15.

Figure 5:
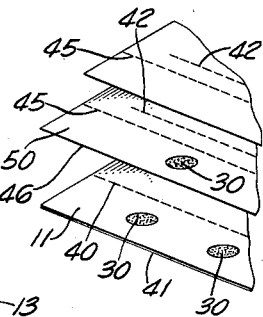
FIGURE 5 is a fragmentary perspective view illustrating the manner of assembly of the booklet.
Figure 4:
FIGURE 4 is a sectional view taken substantially on the line 4—4 of FIGURE 2.

The respective record forms 15 are secured together adjacent their common margins by any convenient means, such as the adhesive areas 30. In accordance with the present invention, novel means are provided for facilitating the opening or unfolding of the booklet, said means further preventing misalignment of the entry spaces 23, 24 and 25 on any particular form 15 with the appropriate entry spaces 12 on the journal sheet 11. The problem of such misalignment becomes particularly acute after a number of the detachable forms have been used and removed from the booklet, due in large part to the accumulation or build-up of the marginal portions of the forms remaining after removal thereof. As shown in the drawings, the means for obviating such difficulties and maintaining the desired alignment are embodied in the manner in which the journal sheet and the record forms are provided with weakened or scored lines which function as a common fulcrum for the opening or folding of the booklets, together with the manner in which the tear-out perforations for the record forms are positioned, relative to the fulcrum line. More specifically, the journal sheet 11 is provided with a perforated line or folding fulcrum 40 extending from top to bottom thereof and parallel to, but relatively closely spaced from, the marginal edge 41 of the sheet 11. Similarly, the record forms 15 are provided with perforated lines 42 which are parallel to the line 40, but preferably spaced a slight distance to the right thereof, i.e., inwardly of the edge 41, when the booklet is in the closed position shown in FIGURES 1 and 5, so that in the open position, the lines 40 and 42 lie in the same plane as shown in FIGURE 4, the plane being substantially parallel to the plane of the opened forms 15 and the journal sheet 11. The above-mentioned spacing of the lines 42 from the line 41 can vary in amount so long as it is sufficient to provide adequate clearance to permit folding of the forms without binding. It has been found that a spacing of approximately $\frac{1}{32}$ inch is adequate for customary paper thickness, but the invention is of course not to be so limited.

Figure 2:
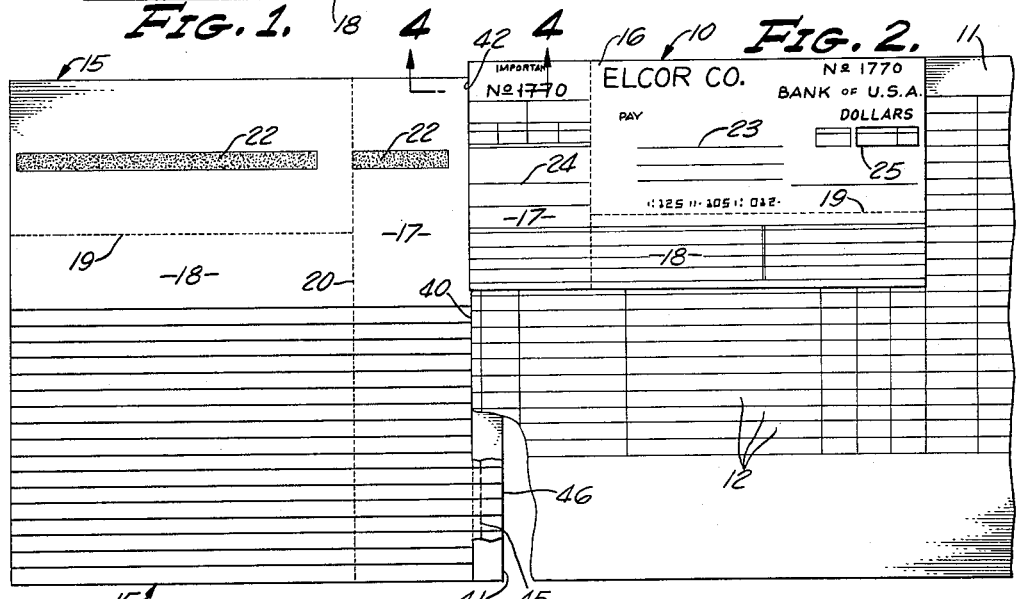
FIGURE 2 is a plan view thereof, illustrating the booklet in opened form ready for use.

The tear-out perforations 45 for the record forms 15 are positioned between the lines 42 and the marginal edges 41 and 46, so that in the open position of FIGURE 2, these perforation lines 45 underlie the face-up portions of the journal sheet and forms 15.

Figure 3:
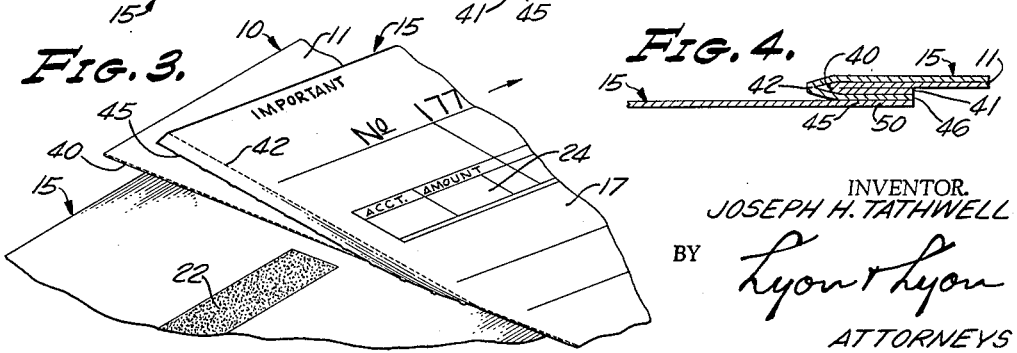
FIGURE 3 is a fragmentary perspective view, illustrating the manner in which one of the record forms is detached from the booklet assembly.

It is believed that the operation and advantages of the present invention are readily apparent from the above description. Thus, in use, the booklet is quickly and easily opened to the position of FIGURE 2, merely by inserting the fingers under the upper right-hand or free margin of the second record form from the top and then flipping the shingled forms to the left, as in the manner of opening a book from the back. This leaves the uppermost form 15 in the exposed position shown in FIGURE 2, with the remaining forms 15 lying flat and out of the way as there illustrated. It will be noted that in this position, both the uppermost form 15 and the journal sheet 11 are folded about the common folding fulcrum lines 40 and 42, the folding having been accomplished without any binding, so that the uppermost form lies flat upon the journal sheet. Further, in this position, the perforation line 45 underlies the journal sheet and the exposed form 15. After the appropriate entries are made on the exposed form 15, the form is detached from the booklet by tearing the same along the perforation line 45, as indicated in FIGURE 3. Because the perforation line 45 is positioned as described, the tab portion 50 of the form 15, which remains after removal of the main body of the form, does not protrude or otherwise interfere with the subsequent use of the booklet. That is, after removal of the first record form 15, the next record form 15 is easily folded to the exposed position for making of the entries thereon, and this operation is easily carried out for each individual record form, unless it is not desired to utilize all of the record forms on the same occasion, in which event, the remaining record forms are simply folded back to the closed position for filing of the booklet until it is needed at a later time.

Having fully described my invention, it is to be understood that I do not wish to be limited to the details set forth but my invention is of the full scope of the appended claims.

I claim:

1. A means for maintaining multiple records comprising a plurality of forms arranged in overlapped relation with only the lowermost form being fully exposed, a summary sheet fixed in underlying relation to said overlapped forms and having appropriately designated areas on its underlying portion disposed for registration with appropriately designated areas on said forms, means for attaching said overlapped forms and said summary sheet together in booklet form such that said forms and said sheet have at least one mutual marginal edge, the areas of attachment thereof extending adjacent one of the mutual marginal edges of said forms and sheet, means permitting the folding of said forms and said sheet about a common line generally parallel to said marginal edges, and means permitting detachment of said forms from the remainder of the assembly, said means comprising a weakened section of the form, said section being positioned between said marginal edges and said common folding line.

2. A means for maintaining multiple records comprising a plurality of forms arranged in overlapped relation with only the lowermost form being fully exposed, a summary sheet fixed in underlying relation to said overlapped forms and having appropriately designated areas on its underlying portion disposed for registration with appropriately designated areas on said forms, impression transfer means for duplicating entries made on said designated areas of the overlapped forms on the appropriately designated areas on said summary sheet, means for attaching said overlapped forms and said summary sheet together in booklet form such that said forms and said sheet have at least one mutual marginal edge, the areas of attachment thereof extending adjacent one of the mutual marginal edges of said forms and sheet, means permitting the folding of said forms and said sheet about a common line generally parallel to said marginal edges, and means permitting detachment of said forms from the remainder of the assembly, said means comprising a weakened section of the form, said section being positioned between said marginal edges and said common folding line.

3. Means for maintaining multiple records comprising a plurality of forms arranged in overlapped relation with only the lowermost form being fully exposed, a summary sheet fixed in underlying relation to said overlapped forms and having appropriately designated areas on its underlying portion disposed for registration with appropriately designated areas on said forms, means for attaching said overlapped forms and said summary sheet together in booklet form such that said forms and said sheet have at least one mutual marginal edge, the areas of attachment thereof extending adjacent one of the mutual marginal edges of said forms and sheet, means permitting the folding of said forms and said sheet about a common line generally parallel to said marginal edges, said means comprising a scored line on each of said forms and sheet, said lines on said forms being in mutual alignment but spaced inwardly of the scored line on said sheet, and means permitting detachment of said forms from the remainder of the assembly, said means comprising a weakened section of the form, said section being positioned between said marginal edges and said common folding line.

4. A means for maintaining multiple records comprising a plurality of forms arranged in overlapped relation with only the lowermost form being fully exposed, a summary sheet fixed in underlying relation to said overlapped forms and having appropriately designated areas on its underlying portion disposed for registration with appropriately designated areas on said forms, impression transfer means for duplicating entries made on said designated areas of the overlapped forms on the appropriately designated areas on said summary sheet, means for attaching said overlapped forms and said summary sheet together in booklet form such that said forms and said sheet have at least one mutual marginal edge, the areas of attachment thereof extending adjacent one of the mutual marginal edges of said forms and sheet, means permitting the folding of said forms and said sheet about a common line generally parallel to said marginal edges, said means comprising a scored line on each of said forms and sheet, said lines on said forms being in mutual alignment but spaced inwardly of the scored line on said sheet, and means permitting detachment of said forms from the remainder of the assembly, said means comprising a weakened section of the form, said section being positioned between said marginal edges and said common folding line.

5. A means for maintaining multiple records comprising a plurality of forms arranged in overlapped relation with only the lowermost form being fully exposed, a summary sheet fixed in underlying relation to said overlapped forms and having appropriately designated areas on its underlying portion disposed for registration with appropriately designated areas on said forms, impression transfer means for duplicating entries made on said designated areas of the overlapped forms on the appropriately designated areas on said summary sheet, means for attaching said overlapped forms and said summary sheet together in booklet form such that said forms and said sheet have at least one mutual marginal edge, the areas of attachment thereof extending adjacent one of the mutual marginal edges of said forms and sheet, means permitting the folding of said forms and said sheet about a common line generally parallel to said marginal edges, and means permitting detachment of said forms from the remainder of the assembly, said means comprising a perforation line on each form, said perforation line being positioned between said marginal edges and said common folding line.

6. A means for maintaining multiple records comprising a plurality of forms arranged in overlapped relation with only the lowermost form being fully exposed, a journal sheet fixed in underlying relation to said overlapped forms and having appropriately designated areas on its underlying portion disposed for registration with appropriately designated areas on said forms, impression transfer means for duplicating entries made on said designated areas of the overlapped forms on the appropriately designated areas on said journal sheet, means for attaching said overlapped forms and said journal sheet together in booklet form such that said forms and said sheet have at least one mutual marginal edge, the areas of attachment thereof extending adjacent one of the mutual marginal edges of said forms and sheet, means permitting the folding of said forms and said sheet about a common line generally parallel to said marginal edges, said means comprising a scored line on each of said forms and sheet, said lines on said forms being in mutual alignment but spaced inwardly of the scored line on said sheet, and means permitting detachment of said forms from the remainder of the assembly, said means comprising a perforation line on each form, said perforation line being positioned between said marginal edges and said common folding line.

7. A means for maintaining multiple records comprising a plurality of forms arranged in overlapped relation with only the lowermost form being fully exposed, a summary sheet fixed in underlying relation to said overlapped forms and having appropriately designated areas on its underlying portion disposed for registration with appropriately designated areas on said forms, means for attaching said overlapped forms and said summary sheet together in booklet form such that said forms and said summary sheet have at least one mutual marginal edge, the areas of attachment thereof extending adjacent one of the mutual marginal edges of said forms and said sheet, means permitting the folding of said forms about a first line generally parallel to the marginal edge adjacent said areas of attachment, means permitting the folding of said sheet about a second line generally parallel to said first line and located between said first line and said marginal edge adjacent to said areas of attachment, and means permitting detachment of said forms from the remainder of the assembly, said means comprising a weakened section of each form, said section being positioned between said second line and said marginal edge adjacent to said areas of attachment.

References Cited by the Examiner

UNITED STATES PATENTS 2,470,586  5/1949  Tathwell _____ 282—9
2,757,940  8/1956  Moss _____ 282—23

FOREIGN PATENTS 607,428  8/1948  Great Britain.

EUGENE R. CAPOZIO, *Primary Examiner.*

LAWRENCE CHARLES, *Examiner.*